(12) United States Patent
Nakamura et al.

(10) Patent No.: US 8,687,982 B2
(45) Date of Patent: Apr. 1, 2014

(54) OSNR MEASURING DEVICE AND OPTICAL COMMUNICATION SYSTEM

(75) Inventors: Kentaro Nakamura, Kawasaki (JP); Norifumi Shukunami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 178 days.

(21) Appl. No.: 13/160,294

(22) Filed: Jun. 14, 2011

(65) Prior Publication Data
US 2011/0311222 A1    Dec. 22, 2011

(30) Foreign Application Priority Data

Jun. 22, 2010  (JP) ................................. 2010-141120

(51) Int. Cl.
*H04J 14/02* (2006.01)
*H04B 10/079* (2013.01)

(52) U.S. Cl.
CPC ............................ *H04B 10/07953* (2013.01)
USPC .............................................. 398/209; 398/95

(58) Field of Classification Search
CPC .................. H04B 10/07953; H04B 10/07955; H04B 10/697
USPC ........... 398/26, 33, 38, 93–95, 140, 195–197, 398/209
See application file for complete search history.

(56) References Cited

U.S. PATENT DOCUMENTS

| | | | |
|---|---|---|---|
| 5,340,979 A | 8/1994 | Baney et al. | |
| 6,344,910 B1 | 2/2002 | Cao | |
| 6,396,605 B1 * | 5/2002 | Heflinger et al. | 398/140 |
| 7,149,407 B1 | 12/2006 | Doerr et al. | |
| 7,149,428 B2 * | 12/2006 | Chung et al. | 398/68 |
| 7,440,170 B2 | 10/2008 | Kao et al. | |
| 7,499,173 B1 | 3/2009 | Brodsky et al. | |
| 8,208,816 B2 * | 6/2012 | Ereifej | 398/159 |

(Continued)

FOREIGN PATENT DOCUMENTS

| | | |
|---|---|---|
| JP | 3311102 | 8/2002 |
| JP | 2003-195370 | 7/2003 |

(Continued)

OTHER PUBLICATIONS

Oh J. M. et al., "Interferometric optical signal-to-noise ratio measurements of telecom signals with degraded extinction ratio" Optics Letters, Optical Society of America, vol. 33, No. 18, Sep. 15, 2008, pp. 2065-2067, XP001516889, ISSN: 0146-9592.

(Continued)

*Primary Examiner* — Dalzid Singh
(74) *Attorney, Agent, or Firm* — Fujitsu Patent Center

(57) ABSTRACT

An OSNR measuring device n OSNR measuring device includes an input port to which a signal light is given; a wavelength filter which includes a variable passband, and selectively takes out an optical component corresponding to a signal optical wavelength to be measured from the signal light; a wavelength control circuit which controls the passband of the wavelength filter; a delay interferometer which branches a light output from the wavelength filter and delays one of the branched lights with respect to the other branched light and in which the branched lights are made to interfere with each other; a photodetector which detects a power of a delay interference light output; and an OSNR calculation circuit which calculates, based on a bandwidth of a passband of the wavelength filter and the power of the delay interference light, an optical signal to noise ratio of a signal optical wavelength to be measured.

13 Claims, 17 Drawing Sheets

(56) References Cited

U.S. PATENT DOCUMENTS

| 8,331,786 B2* | 12/2012 | Hashimoto | 398/81 |
| 2003/0035172 A1 | 2/2003 | Chen et al. | |
| 2004/0057049 A1* | 3/2004 | Bruch et al. | 356/328 |
| 2007/0177876 A1 | 8/2007 | Ooi et al. | |
| 2008/0089700 A1 | 4/2008 | Takahashi | |

FOREIGN PATENT DOCUMENTS

| JP | 3467296 | 11/2003 |
| JP | 2006-020364 | 1/2006 |
| JP | 2007-208546 | 8/2007 |
| JP | 2008-98975 | 4/2008 |
| JP | 2010-025670 | 2/2010 |
| WO | WO-2010-041334 A1 | 4/2010 |

OTHER PUBLICATIONS

Bakaul, M., "Low-Cost PMD-Insensitive and Dispersion Tolerant In-Band OSNR Monitor Based on Uncorrelated Beat Noise Measurement", IEEE Photonics Technology Letters, vol. 20, No. 11, pp. 906-908, Jun. 1, 2008, XP011214461.

Extended European Search Report dated Oct. 21, 2010 for corresponding European Application No. 10166286.4.

USPTO [DOBSON] "U.S. Appl. No. 12/818,613," [CTNF] Non-Final Rejection issued on Oct. 1, 2012.

Japanese Office Action mailed Jan. 7, 2014 for corresponding Japanese Application No. 2010-141120, with English-language translation.

* cited by examiner

OSNR MEASURING DEVICE AND OPTICAL COMMUNICATION SYSTEM

CROSS-REFERENCE TO RELATED APPLICATIONS

This application is based upon and claims the benefit of priority from the prior Japanese Patent Application No. 2010-141120 filed on Jun. 22, 2010, the entire contents of which are incorporated herein by reference.

FIELD

The embodiments discussed herein relates to an Optical Signal to Noise Ratio (OSNR) measuring device that measures an OSNR indicating a quality of an optical signal transmitted and received in an optical communication system.

BACKGROUND

In an optical communication system, an optical signal transmitted from an optical transmitter is propagated in an optical fiber as a transmission path and is transmitted to an optical receiver. At this time, an optical amplifier is used to compensate a loss generated in the transmission path. A postamplifier allocated on an output side of the optical transmitter, a preamplifier allocated in front of the optical transmitter, or an inline amplifier that is used for multiple relay of an optical signal is given as an example of allocation of the optical amplifier. For example, an Erbium-Doped Fiber Amplifier (EDFA) using an erbium-doped fiber as an optical amplification medium is widely used in an optical communication system of 1550 nm band.

The optical amplifier outputs an amplified signal light and an amplified spontaneous emission (ASE). Since the ASE is randomly generated to interfere with the signal light, the ASE may be a noise component in the optical communication system. Since the property of the optical receiver is limited according to the noise component, it is important to measure the signal component and the noise component in the optical communication system. Usually, the characteristic of the optical receiver is expressed in resistance of an optical signal to noise ratio (OSNR).

In a broadband access network, a larger capacity may be achieved by applying a Wavelength Division Multiplexing (WDM) technique according to increase of Internet traffic. A transmission rate per one wavelength in a WDM optical communication system is shifted from 2.5 Gbps or 10 Gbps to 40 Gbps or 100 Gbps. In the WDM optical communication system in which the transmission rate is equal to or more than 40 Gbps, the interval between optical pulses of 1 bit width is narrower, and the spectrum width (frequency band) of the signal light is wider compared to a case of the transmission rate of 10 Gbps. Due to this, deterioration of the transmission character is increased by influence of the noise of the optical amplifier, and wavelength dispersion and polarization dispersion of the transmission path optical fiber. As a result, a phase modulating method such as, for example, Differential Phase Shift Keying (DPSK) and Differential Quadrature Phase Shift Keying (DQPSK) that have excellent noise resistance and dispersion resistance is employed as a phase modulating method that is different from a conventional On-Off Keying (OOK) method.

FIG. 1 is a diagram illustrating an example of a related technique of an output spectrum of the EDFA used in the WDM optical communication system. As illustrated in FIG. 1, in the EDFA, a plurality of signal lights allocated in 1550 nm band is amplified, and a wideband ASE of approximately 40 nm is generated. In the WDM optical communication system in which a plurality of EDFAs is allocated on a transmission path to perform multiple relay transmission of WDM light, ASEs are accumulated every time the WDM light goes through the EDFA. The WDM light on which the ASEs are accumulated is branched into lights of each wavelength by the branch unit allocated in the reception end and is then input into the optical receiver corresponding to each wavelength to be subjected to the receiving processing.

FIG. 2 is a diagram illustrating a related art example of an optical spectrum of one wavelength that is output from the branch unit. In this manner, the optical receiver corresponding to each wavelength receives each light that includes a spectrum in which the signal light component and the ASE component are superimposed. The OSNR [dB] of the reception light is expressed by the formula (1) if the power of the signal light component is Psig [mW] and the power of the ASE component of 0.1 nm bandwidth in the signal optical wavelength.

[Formula 1]

$$OSNR[\text{dB}] = 10 \times \log\left(\frac{P_{sig}}{P_{ase},\ 0.1\ \text{nm}}\right) \quad (1)$$

Therefore, to obtain the OSNR, the power of the signal light component and the power of the ASE component included in the reception light are desired to be measured. If the spectrum of the reception light is measured by using an optical spectrum analyzer or the like, the powers are measured where the signal optical component overlaps with the ASE component on the same wavelength (see FIG. 2). As a result, the OSNR may not be obtained. To separate the signal optical component from the ASE component, for example, various techniques such as a pulse technique, an ASE interpolation technique, a probe technique, a polarization extinction ratio technique, and a time-domain technique, which are described in Yoshinori Namihira, "DWDM Optical Fiber Measurement Technologies," The Optronics Co., Ltd., pp. 95 to 100, March 2001, have been applied.

Specifically, the pulse technique is used to measure a spectrum of the output light by turning on and off the input light to the optical amplifier by using an optical switch or the like and measuring an ASE level when the input light is turned off (see, for example, Japanese Patent No. 3467296). In the ASE interpolation technique, the spectrum of the output light of the optical amplifier is measured, the ASE part is taken out from the spectrum, and the level of the ASE component that overlaps with the signal optical component on the same wavelength is estimated (see, for example, Japanese Patent No. 3311102).

SUMMARY

According to an aspect of the invention, an OSNR measuring device n OSNR measuring device includes an input port to which a signal light is given; a wavelength filter which is optically coupled to the input port, includes a variable passband, and selectively takes out an optical component corresponding to a signal optical wavelength to be measured from the signal light; a wavelength control circuit which controls the passband of the wavelength filter; a delay interferometer which branches a light output from the wavelength filter and delays one of the branched lights with respect to the other branched light and in which the branched lights are made to interfere with each other; a photodetector which detects a power of a delay interference light output from the delay interferometer; and an OSNR calculation circuit which calculates, based on a bandwidth of a passband of the wavelength filter and the power of the delay interference light detected by the photodetector, an optical signal to noise ratio of a signal optical wavelength to be measured.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
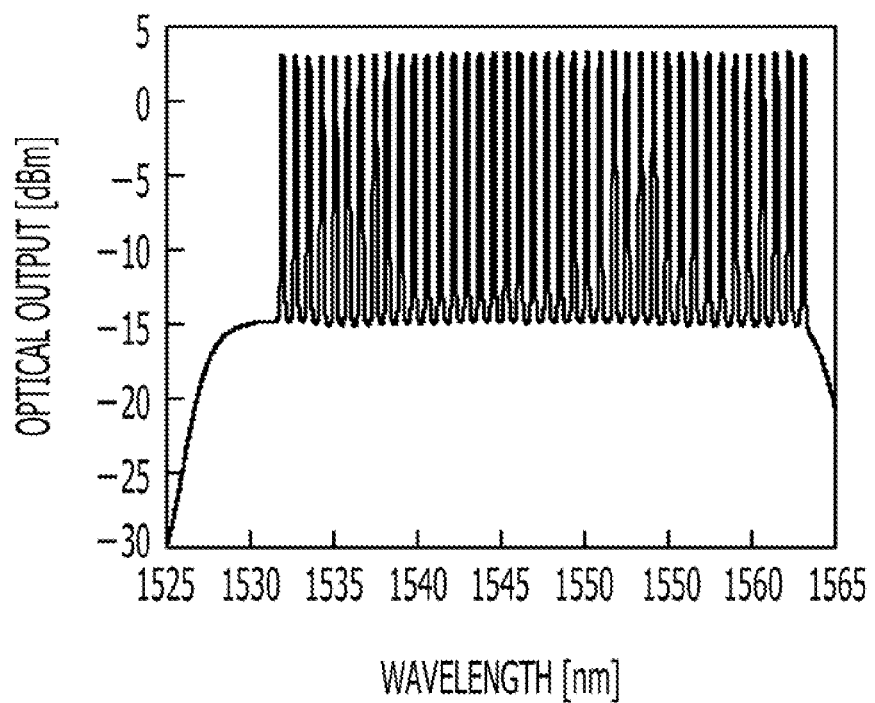
FIG. 1 is a diagram illustrating a related art example of an output spectrum of an EDFA used in a WDM optical communication system.
Figure 2:
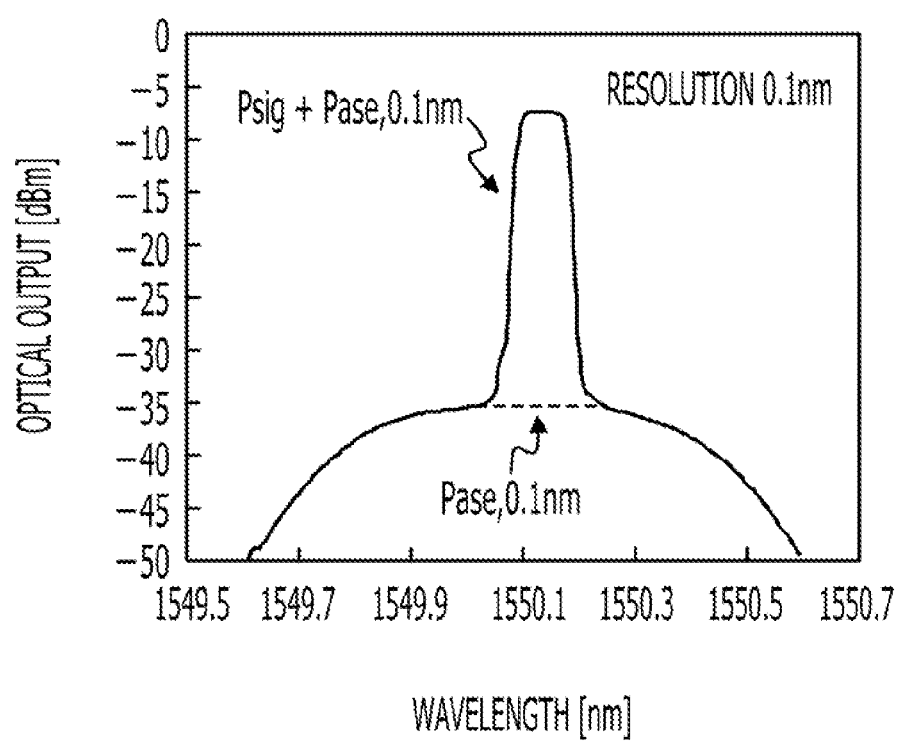
FIG. 2 is a diagram illustrating a related art example of an optical spectrum of one wavelength output from a branch unit allocated in a reception end of the WDM optical communication system.
Figure 3:
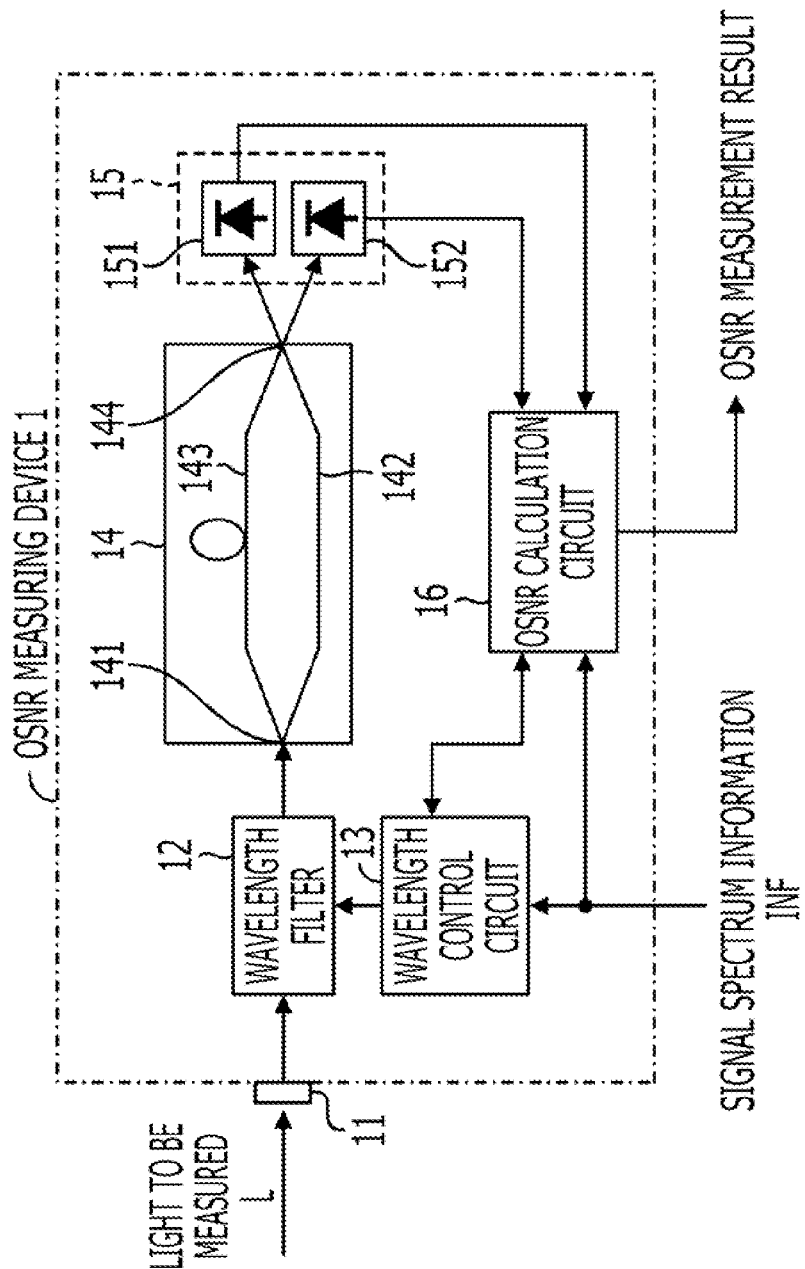
FIG. 3 is a diagram illustrating an example of an OSNR measuring device according to a first embodiment.

Embodiments of the present invention will be described below with reference to the diagrams. FIG. 3 is a diagram illustrating an example of an OSNR measuring device according to a first embodiment. As illustrated in FIG. 3, an OSNR measuring device 1 includes, for example, an input port 11 to which a light to be measured L is given, a wavelength filter 12 that is optically coupled to the input port 11, a wavelength control circuit 13 that controls the wavelength filter 12, a delay interferometer 14 to which an output light of the wavelength filter 12 is given, a photodetector 15 that detects a power of the interference light output from the delay interferometer 14, and an OSNR calculation circuit 16 that calculates an OSNR in a signal optical wavelength that is to be measured based on a detection result of the photodetectoer 15.

For example, a WDM light obtained by multiplexing a plurality of signal lights with various wavelengths as the light to be measured L is given to the input port 11. A transmission rate of the signal light of each wavelength is arbitrary. A high-speed signal light of 40 Gbps or more may be a measurement target of the OSNR. The modulation method of the signal light may be applied to a phase modulating method such as DPSK or DQPSK, or an optical modulation method such as RZ-D (Q) PSK, in which the phase modulation light is pulsed, as well as a general On-Off Keying (OOK) method.

The wavelength filter 12 has a variable passband and selectively takes out an optical component corresponding to a signal optical wavelength from the light to be measured L that is input through the input port 11 and outputs the light optical component to the delay interferometer 14. The variable passband of the wavelength filter 12 is controlled by the wavelength control circuit 13 according to a measured wavelength. Specifically, a monochromator, a wavelength variable filter, a wavelength/bandwidth variable filter, a wavelength selection switch, and the like, for example, may be used as the wavelength filter 12. The wavelength control circuit 13 is a circuit that includes, for example, a processer for control, a memory for information storage, and the like.

Figure 4:
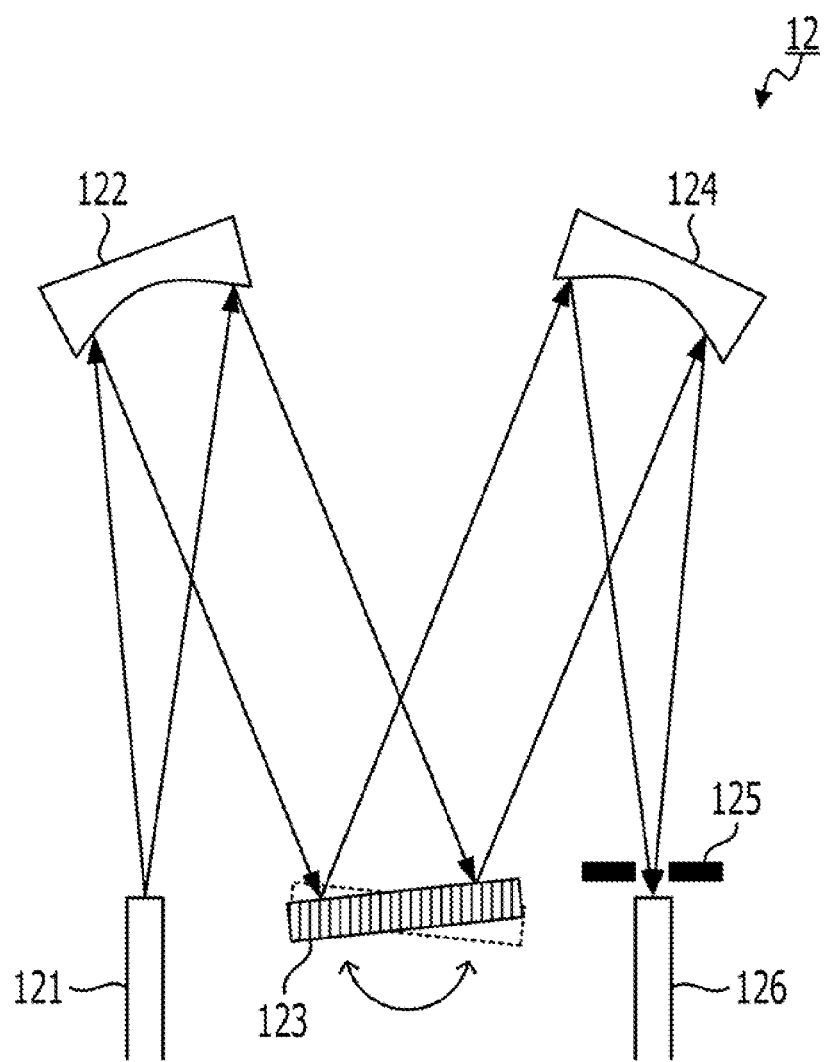
FIG. 4 is a diagram illustrating an example of a monochromator used as a wavelength filter according to the first embodiment.

FIG. 4 is a diagram illustrating an example of the wavelength filter 12 that uses a monochromator. As illustrated in FIG. 4, if the light to be measured L given to an emission port 121 of the monochromator goes through a collimating mirror 122, a grating 123, a focusing mirror 124, and a slit 125 sequentially, the optical component corresponding to the signal optical wavelength to be measured is selectively coupled to an incident port 126.

Specifically, the collimating mirror 122 converts the light to be measured L, which is emitted by the emission port 121, into a parallel light and emits the parallel light to the grating 123. The grating 123 emits the parallel light from the collimating mirror 122 in various directions according to the wavelength. The focusing mirror 124 gathers the lights reflected by the grating 123 in various positions near the slit 125 according to each wavelength. As for the grating 123, an angle of a reflection surface in an incident direction of the parallel light from the collimating mirror 122 is variable, and the angle (the rotation angle of the grating 123) of the reflection surface is set according to the measured wavelength. Accordingly, from among the lights with various wavelengths gathered near the slit 125, the light corresponding to the measured wavelength goes through the slit 125 and is then coupled to the incident port 126.

Even though the diagram is omitted, known optical devices such as an optical filter using an Arrayed-Waveguide Grating (AWG), a Fiber Bragg Grating (FBG), or the like, and an Acousto Optic Tunable Filter (AOTF) are given as specific examples of the wavelength variable filter that may be used as the above-described wavelength filter 12, for example. Moreover, for example, OTF-950 and OTF-350 of SANTEC CORPORATION or BVF-200 of Alnair Labs Corporation is applicable as the wavelength/bandwidth variable filter that may vary the bandwidth as well as the central wavelength of the passband. For example, a switch used to switch an optical path between the input port and the output port by combining a grating and a movable mirror is known as the wavelength selection switch. For the wavelength selection switch, the angle of the movable mirror is set according to the measured wavelength.

Based on information INF (hereinafter referred to as "signal light information") that is given by an external unit of the OSNR measuring device 1 and related to the signal light to be measured, the wavelength control circuit 13 controls the wavelength filter 12 so that the central wavelength of the passband of the wavelength filter 12 corresponds to the signal optical wavelength to be measured. The signal light information INF includes information, for example, a wavelength of an optical light to be measured, a transmission rate, a modulation method, and the like. Specifically, when the wavelength filter 12 is configured with the monochromator illustrated in FIG. 4, the wavelength control circuit 13 controls the rotation angle of the grating 123 so that the optical component corresponding to the signal optical wavelength to be measured goes through the slit 125 and is then coupled to the incident port 126. When the configuration of the wavelength filter 12 includes the wavelength/bandwidth variable filter, the wavelength control circuit 13 controls the bandwidth of the passband as well as the central wavelength of the passband of the wavelength filter 12 according to the measured wavelength. In the control of the bandwidth, the spectrum width of the signal light is determined based on the transmission rate and the modulation method of the transmission rate of the signal light to be measured, and the bandwidth desired for OSNR measurement is set according to the spectrum width.

Regarding the delay interferometer 14, a Y branch unit 141 that branches an output light from the wavelength filter 12 into two lights, a first arm 142 to which one of the two lights branched by the Y branch unit 141 is given, a second arm 143 to which the other light is given, and a Mach-Zehnder Interferometer Type optical waveguide provided with an X coupler unit 144 that makes the lights propagated in the arms 142 and 143 interfere with each other are formed on a desired substrate. In this case, the optical path length of the second arm 143 is designed to be longer than the optical path length of the first arm 142, so that the light propagated in the second arm 143 is delayed with respect to the light propagated in the first arm 142. The light delay amount τ is adjustable by changing a temperature of the delay interferometer 14 configured with a Planar Lightwave Circuit (PLC) using a heater, a Peltier device, or the like. The light propagated in the arms 142 and 143 is interfered by being given to the X coupler unit 144. The delay interference light is output from two output ports of the X coupler unit 144 and is then transmitted to the photodetector 15.

The photodetector 15 receives lights output from each output port of the delay interferometer 14 and includes a pair of photodetectors 151 and 152 that generates an electric signal of which the level varies according to the each optical power. The electric signal generated by the photodetectors 151 and 152 are transmitted to the OSNR calculation circuit 16.

The OSNR calculation circuit 16 uses the output signal from the photodetectors 151 and 152, the output signal from the wavelength control circuit 13 indicating a bandwidth of the wavelength filter 12, and the signal light information INF given from the external part of the OSNR measuring device 1 to calculate the OSNR corresponding to the measured wavelength according to the algorithm described below and outputs the calculation value as a measurement result of the OSNR to the external unit. For example, a processor may be used as the OSNR calculation circuit 16.

Figure 5:
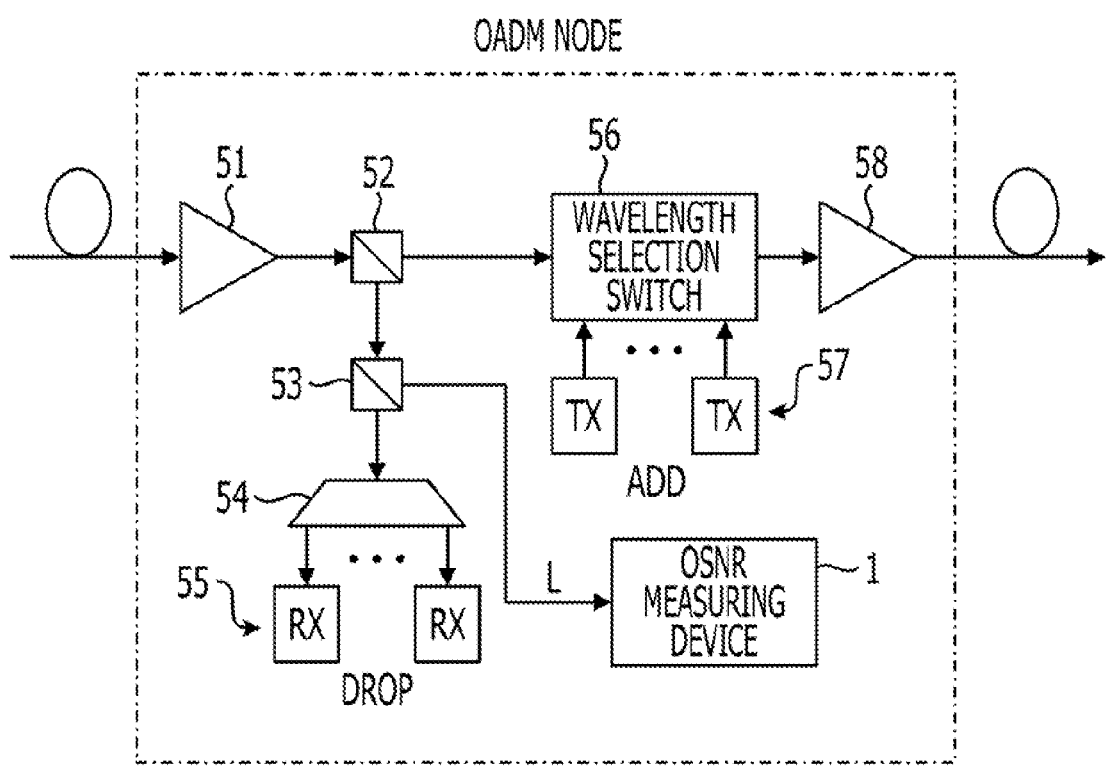
FIG. 5 is a diagram illustrating an example of a case where the OSNR measuring device according to the first embodiment is applied to an OADM node.

FIG. 5 is a diagram illustrating an example of a case where the OSNR measuring device 1 is applied to an Optical Add-Drop Multiplexing (OADM) node of the WDM optical communication system. However, the application position of the OSNR measuring device 1 is not limited to the OADM node. The OSNR measurement by the OSNR measuring device 1 may be performed in an arbitrary position in the WDM optical communication system.

In the application example illustrated in FIG. 5, the WDM lights input into the OADM node are collectively amplified by an optical amplifier 51 and are then branched into two lights by a branch unit 52. One of the branched lights is transmitted to a branch unit 53, and the other branched light is transmitted to the wavelength selection switch 56. The WDM light from the branch unit 52 is branched into two lights by the branch unit 53. One of the branched lights is transmitted as the light to be measured L to the OSNR measuring device 1. The other branched light is transmitted to a branch unit 54. In the branch unit 54, the WDM lights branched by the branch units 52 and 53 are separated according to the wavelength, and the signal light of each wavelength is received by an optical receiver (RX) 55 in which the signal light of each wavelength corresponds as a drop light, respectively. The wavelength selection switch 56 selects either the signal light (through light) output from the branch unit 52 or the signal light (add light) output from an optical transmitter (TX) 57 as the signal light of each wavelength transmitted to a downstream node. The signal lights selected by the wavelength selection switch 56 are collectively amplified by an optical amplifier 58 and output to the transmission path on the downstream side.

FIG. 5 illustrates an example in which both branching (drop) and inserting (add) of the signal light corresponding to the WDM light are performed. Even if either the branching or the inserting is performed, the OSNR measuring device 1 is applicable in the way equivalent to the above-described way. For example, in a case of a node in which the inserting of the signal light with respect to the WDM light is performed and the branching is not performed, the branch unit 53, the branch unit 54, and the optical receiver 55 are omitted in FIG. 5, and one of the lights branched by the branch unit 52 is transmitted as the light to be measured L to the OSNR meaning device 1.

Operations of the OSNR measuring device 1 according to the first embodiment will be described below. The OSNR measuring device 1 has different operations in a case where the OSNR of the signal light of a non-phase modulating method included in the light to be measured L is measured and a case where the OSNR of the signal light of the phase modulating method is measured, respectively. Therefore, the case where the OSNR of the signal light of the non-phase modulating method is measured will be described with reference to FIG. 6.

Figure 6:
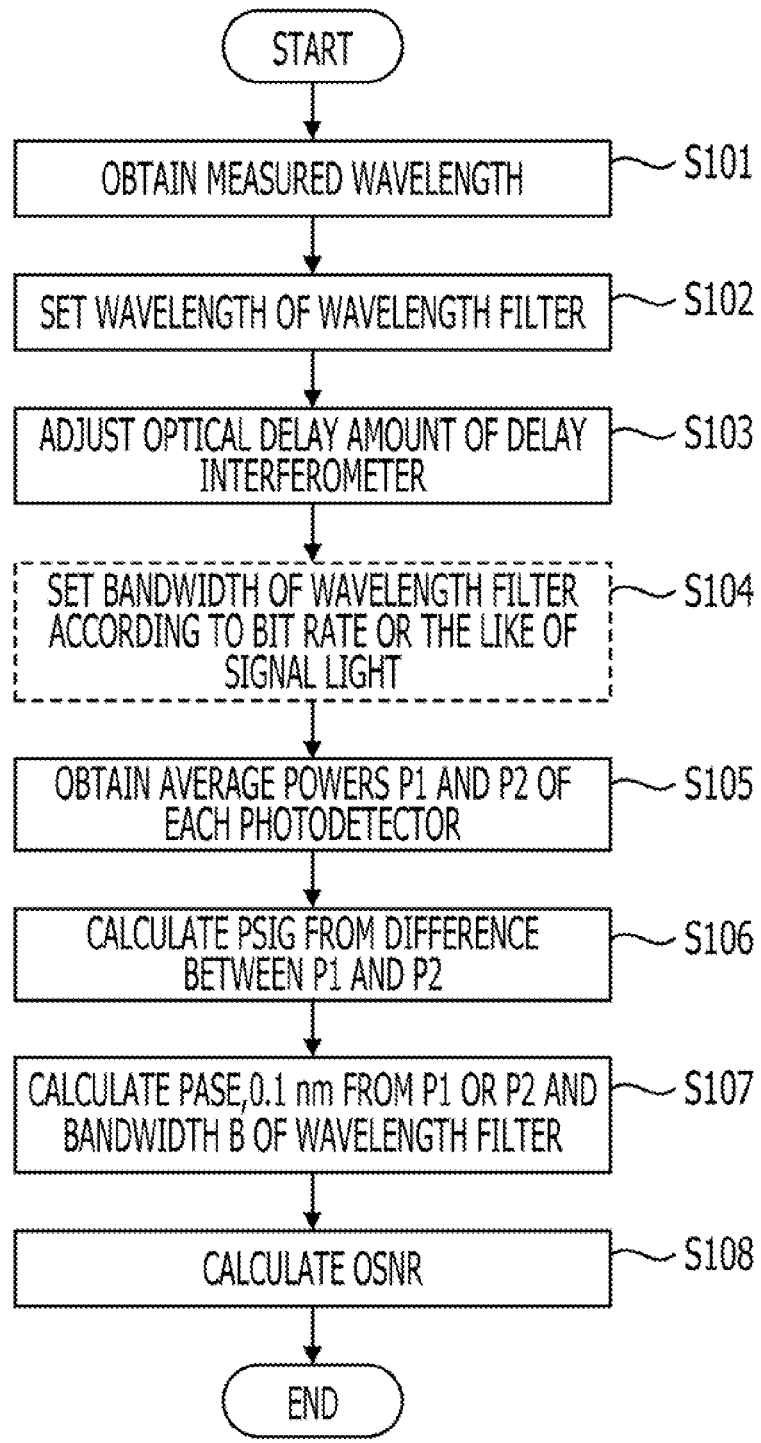
FIG. 6 is an example of a method for measuring an OSNR of a signal light of a non-phase modulating method according to the first embodiment.

FIG. 6 is an example of a method for measuring the OSNR of the signal light of the non-phase modulating method. When the OSNR measuring device 1 is started, in Operation 101 (illustrated as S101 in the diagram), the wavelength control circuit 13 obtains the signal optical wavelength, which is to be measured, based on the signal light information INF given by the external unit. In Operation 102, the wavelength control circuit 13 sets a central wavelength of the passband of the wavelength filter 12 according to the measured wavelength. Accordingly, the central wavelength of the passband of the wavelength filer 12 corresponds to the measured wavelength, so that the optical component, which includes the signal light and ASE corresponding to the measured wavelength from the light to be measured L given to the input port 11, is selectively taken out and transmitted to the delay interferometer 14. In the delay interferometer 14, the output light from the wavelength filter 12 is branched into two lights by the Y branch unit 141, and a delay interference light is generated if the X coupler unit 144 combines the light propagated in the arm 142 and the light propagated in the arm 143 and given with the optical delay amount τ. The delay interference lights are output from the two output ports of the coupler unit 144 in a ratio according to the light delay amount τ and are converted photoelectrically by the photodetectors 151 and 152 corresponding to the photodetector 15.

In Operation 103, with reference to the output signal from the photodetectors 151 and 152, the optical delay amount τ of the delay interferometer 14 is adjusted.

In the adjustment of the optical delay amount r, a temperature or the like of the delay interferometer 14 is optimized so that the phase difference between the lights propagated in the arms 142 and 143 is 0 or τ[rad]. If the phase difference is 0 or π[rad], the average level of one of the output signals from the photodetectors 151 and 152 is maximum, and the average level of the other output signal is minimum. A condition of τ≠0 [sec] includes an optical delay in a case where an optical path length difference between the arm 142 and the arm 143, which are designed with the substantially same length, is generated due to a manufacturing error or the like.

In Operation 104, if the bandwidth of the passband of the wavelength filter 12 is variable in a case where a wavelength/bandwidth variable filter or the like is applied, the wavelength control circuit 13 determines the spectrum width of the signal light to be measured based on the signal light information INF and sets the bandwidth of the wavelength filter 12 according to the spectrum width. If the wavelength filter 12 includes the monochromator, the wavelength variable filter, or the wavelength selection switch, the bandwidth of the passband is usually fixed, so that the operation of Operation 104 is omitted.

When the operations in Operation 101 to Operation 104 are completed, the OSNR measurement is prepared. Thus, calculating processing of the OSNR by the OSNR calculation circuit 16 is performed. In Operation 105, based on the output signal of the photodetectors 151 and 152, the OSNR calculation circuit 16 obtains an average optical power P1 that is detected by the photodetector 151 and an average optical power P2 that is detected by the photodetector 152.

The average optical powers P1 and P2 detected by the photodetectors 151 and 152 will be described in detail. The light propagated in the arms 142 and 143 of the delay interferometer 14 include the signal light component and the ASE component. Since the signal light component propagated in the arms 142 and 143 are coherent, interference is generated in the X coupler unit 144. In Operation 103, the optical delay amount τ of the delay interferometer 14 is adjusted so that the phase difference between the lights propagated in the arms 142 and 143 is 0 or π [rad]. Therefore, the delay interference light of the signal optical component is output from one of the two output ports of the X coupler unit 144.

On the other hand, regarding the ASE component propagated in the arms 142 and 143, for example, the ASE generated in the optical amplifier 51 on the input side or the accumulated ASE generated in the optical amplifier allocated in a node at an upstream of the OAMD node is branched by the Y branch unit 141, and each of the ASE components is incoherent. Therefore, no interference is generated in the X coupler unit 144, the ASE component combined by the X coupler unit 144 is output from the two output ports in the substantially equal ratio.

Therefore, the average optical powers P1 and P2 detected by the photodetectors 151 and 152 reflect the quality of the signal light component and the ASE component of the delay interferometer 14 as described above. For example, if the optical delay amount τ is adjusted so that the delay interference light of the signal optical component is output to the photodetector 152 side, the following formulas (2) and (3) with respect to the average optical powers P1 and P2 detected by the photodetectors 151 and 152 are obtained when the total power of the signal optical component is Psig [mW] and the total power of the ASE component is Pase, total [mW].

[Formula 2]

$$P1 = 0.5 \times P_{ase}, \text{total} \quad (2)$$

[Formula 3]

$$P2 = P_{sig} + 0.5 \times P_{ase}, \text{total} \quad (3)$$

Based on the formulas (2) and (3), the power Psig [mW] of the signal optical component is expressed by the formula (4). The total of the average optical powers P1 and P2 is obtained by the following formula (5).

[Formula 4]

$$P_{sig} = P2 - P1 \quad (4)$$

[Formula 5]

$$P1 + P2 = P_{sig} + P_{ase}, \text{total} \quad (5)$$

According to the relation between the formula (4) and the formula (5), the total power of the ASE component is obtained by Pase, total=2×P1. If the total power is converted into the ASE power Pase, 0.1 nm of 0.1 nm band by using the bandwidth B [nm] of the wavelength filter 12, the following formula (6) is obtained.

[Formula 6]

$$P_{ase}, 0.1 \text{ nm} = 2 \times P1 \times \frac{0.1}{B} \quad (6)$$

Accordingly, the OSNR [dB] of the signal optical wavelength to be measured may be expressed by the following formula (7) based on the relation between the formula (4) and the formula (6).

[Formula 7]

$$OSNR[\text{dB}] = 10 \times \log(P_{sig}) - 10 \times \log(P_{ase}, 0.1 \text{ nm}) = \\ 10 \times \log(P2 - P1) - 10 \times \log\left[2 \times P1 \times \frac{0.1}{B}\right] \quad (7)$$

According to the above-described relation, to calculate the OSNR of the signal optical wavelength to be measured, in Operation 106 illustrated in FIG. 6, the difference between the average optical power P1 and the average optical power P2 is obtained, and the power Psig of the signal optical component expressed by the formula (4) is calculated in the OSNR calculation circuit 16. In Operation 107, by using the average optical power P1 of the photodetector 151 and the bandwidth B of the wavelength filter 12, the ASE power Pase, 0.1 nm of 0.1 nm band expressed by the formula (4) is calculated. In Operation 108, by using Psing and Pase, 0.1 nm, the OSNR of the signal optical wavelength to be measured according to the formula (7) is calculated.

Figure 7:
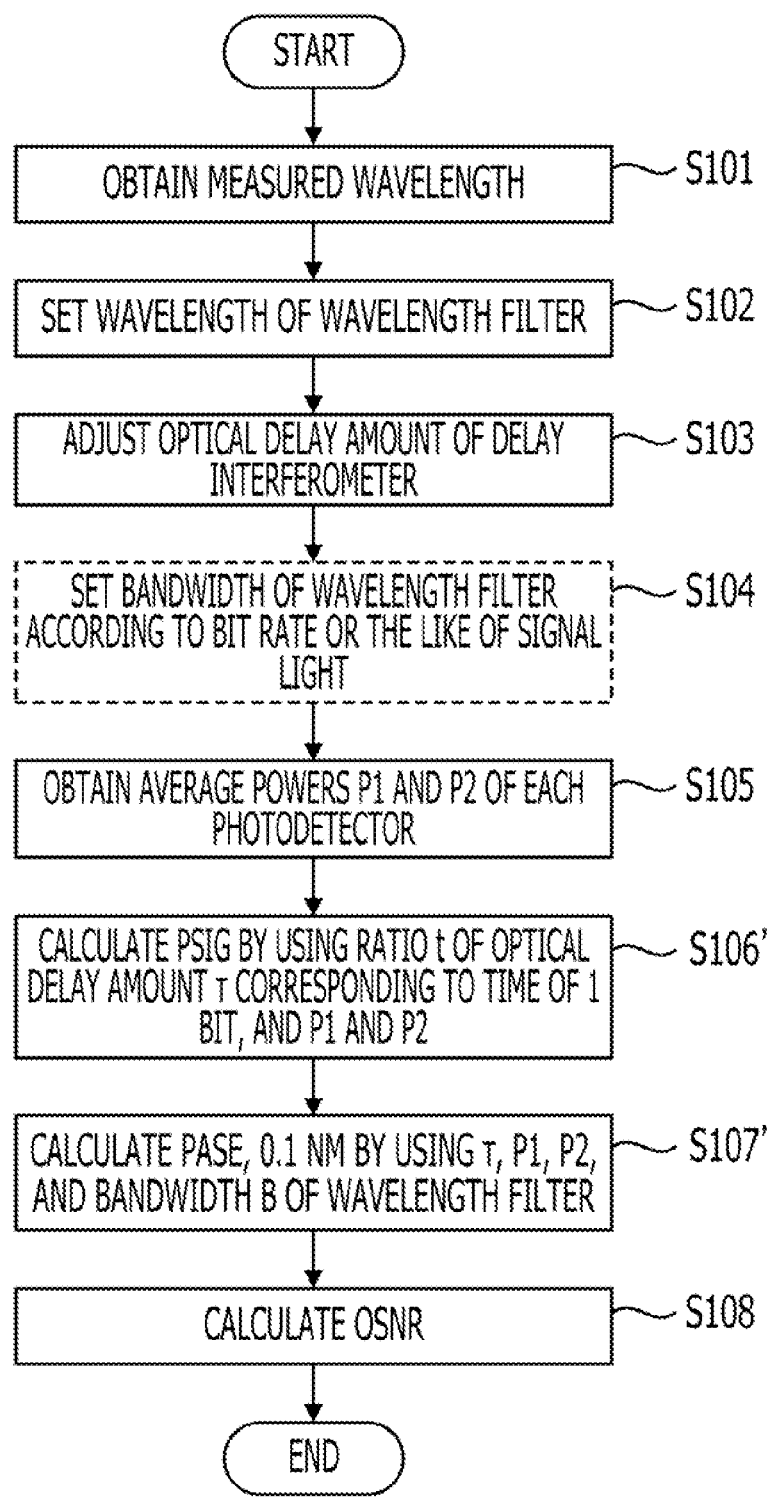
FIG. 7 is an example of a method for measuring the OSNR of the optical signal of the phase modulating method according to the first embodiment.

With reference to the flowchart illustrated in FIG. 7, operations in a case where the OSNR of the signal light of the phase modulating method is measured will be described. FIG. 7 is an example of a method for measuring the OSNR of the signal light of the phase modulating method. When the OSNR measurement of the signal light of the phase modulating method is performed, in the operations equivalent to Operation 101 to Operation 104 in which the OSNR measurement of the signal light of the phase modulating method is performed, the setting of the passband of the wavelength filter 12 and the light delay amount τ of the delay interferometer 14 are adjusted as preparation for the OSNR measurement.

Figure 8A:
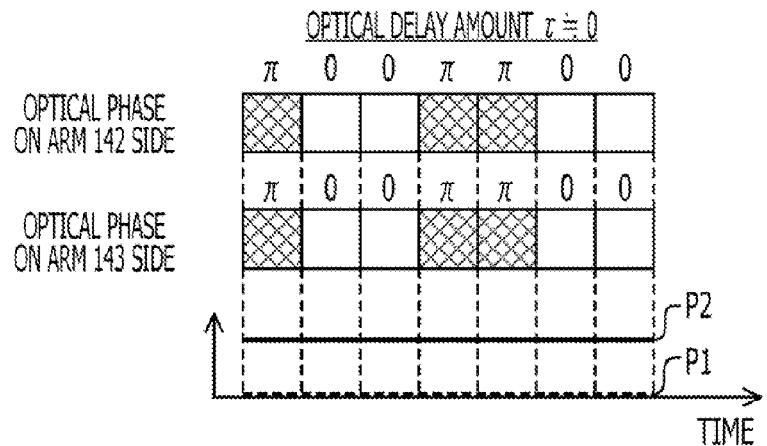
FIGS. 8A to 8C are diagrams illustrating examples of change of an optical power detected by each photodetector according to an optical delay amount of a delay interferometer.
Figure 8B:
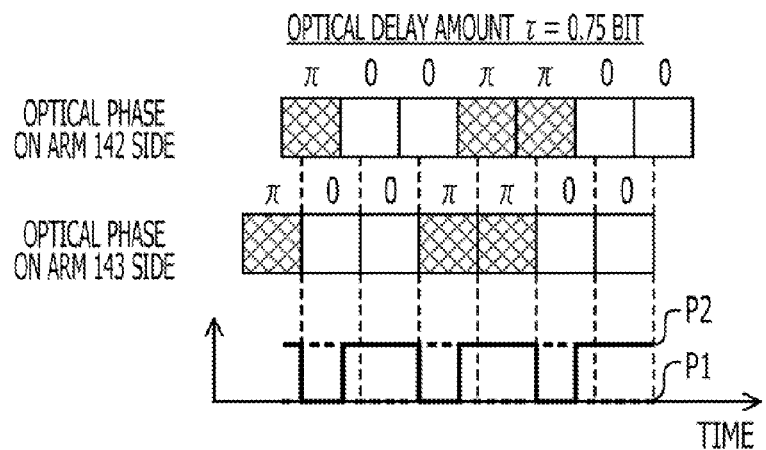
Figure 8C:
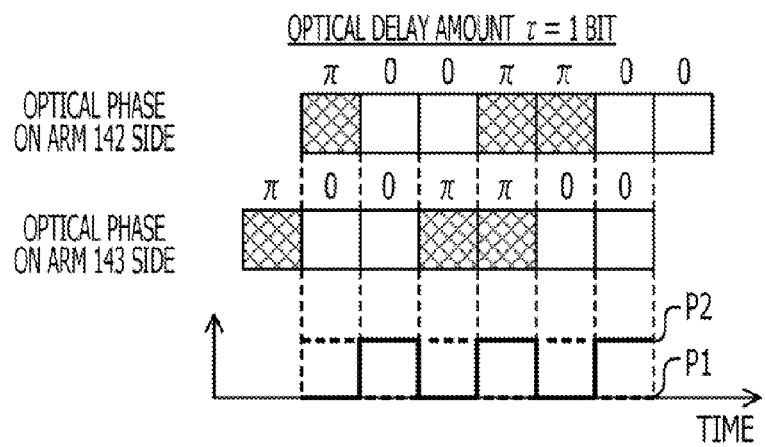

In case of a signal light of the phase modulating method, the phase of the signal light propagated in the arms 142 and 143 of the delay interferometer 14 varies according to the bit value. FIGS. 8A to 8C are diagrams illustrating examples of a case where the optical power detected by each photodetector according to the optical delay amount of the delay interferometer. As illustrated in FIGS. 8A to 8C, for example, in a case where a signal light to which binary phase modulation is applied, the phase of the signal lights propagated in the arms 142 and 143 is varied to become 0 or π according to the bit value. FIG. 8A illustrates an example of a case where the light delay amount of the delay interferometer 14 is adjusted to τ≈0. In the case of τ≈0, since no phase difference is hardly generated between the signal lights propagated in the arms 142 and 143, the delay interference light is output to one (the photodetector 152 in this case) of the photodetectors 151 and 152.

If the optical delay amount τ of the delay interferometer 14 is increased, the ratio in which the phase difference between the signal lights propagated in the arms 142 and 143 increases. Therefore, the delay interference light is output to the photodetector 151 as well. FIG. 8B is an example of a case where the optical delay amount τ of the delay interferometer 14 is adjusted to increase 0.75 fold of the time of 1 bit. If the optical delay amount τ of the delay interferometer 14 corresponds to the time of 1 bit (100% delay), the delay interference light is output to the photodetectors 151 and 152 in the substantially same ratio as described in FIG. 8C. In this case, if the ratio of a code "1" to all the codes on the transmission side of the signal light is 50%, the average optical power P1 and the optical light power P2 detected by the photodetectors 151 and 152 are substantially equal to each other.

FIGS. 8A to 8C illustrate example an example of the signal light to which the binary phase modulation is applied. However, the example is not limited to the binary phase modulation in which the OSNR measuring device 1 may measure the OSNR. The OSNR measuring device 1 is effective in all phase modulation methods of $2^n$ where n is a natural number.

On the other hand, the ASE component propagated in the arms 142 and 143 is incoherent (in the substantially same as the case of the signal light of the non-phase modulating method), no interference is generated in the X coupler unit 144. Due to this, the ASE component combined by the X coupler unit 144 does not depend on the optical delay amount τ of the delay interferometer 14 and is output to the photodetectors 151 and 152 in the substantially equal ratio.

Figure 9:
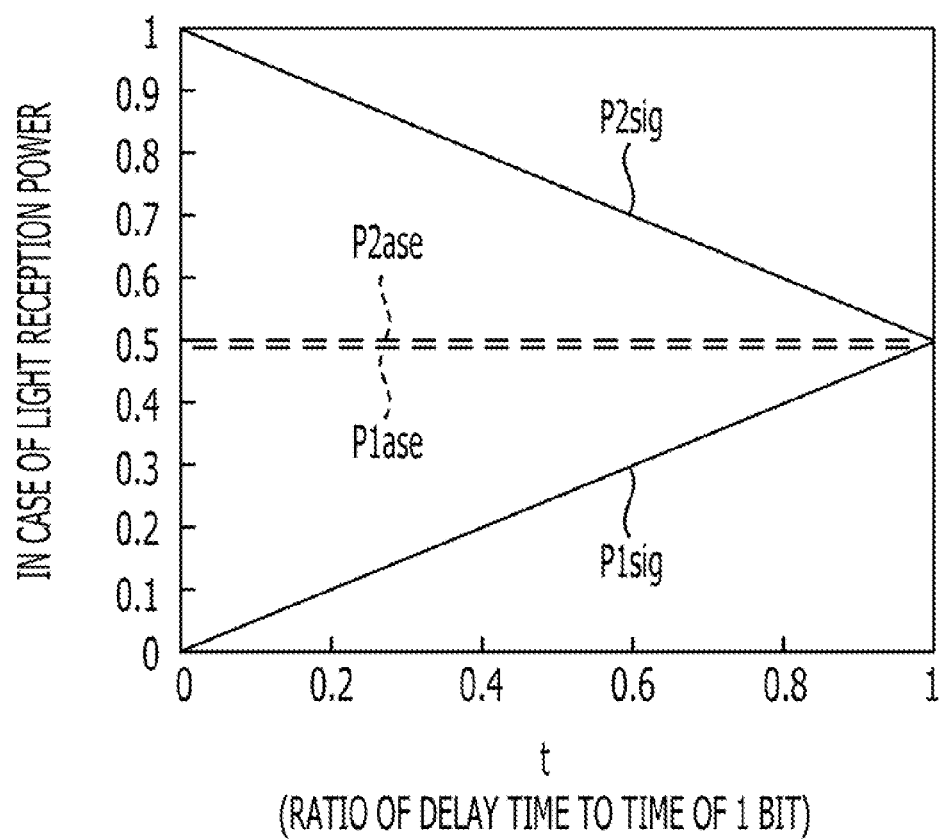
FIG. 9 is a diagram illustrating an example of a ratio of the signal light component and the ASE component received by the photodetector, and a relation of the optical delay amount of the delay interferometer.

FIG. 9 is a diagram illustrating a ratio of the signal light component, which is received by the photodetectors 151 and 152 and of the ASE component, and a relation of the optical delay amount τ of the delay interferometer 14. The transverse axis t indicates a ratio of the optical delay amount τ of the delay interferometer 14 corresponding to the time of 1 bit of the signal light. In this manner, if a ratio t of the optical delay amount corresponding to the time of 1 bit increases, the ratio of the reception power P1sig of the signal optical component of the photodetector 151 increases, so that the ratio of the reception power P2sig of the signal light component of the photodetector 152 decreases. On the other hand, the ratio of the reception powers P1ase and P2ase of the ASE component in the photodetectors 151 and 152 is almost constant regardless of a change of the ratio t of the optical delay amount τ with respect to the time of 1 bit.

Based on the relation illustrated in FIG. 9, if the average light powers P1 and P2 [mW] of the photodetectors 151 and 152 are formulated by using the total power Pase, total [mW], of the ASE component, the relation between the following formula (8) and formula (9) is obtained.

[Formula 8]

$$P1 = 0.5 \times t \times P_{sig} + 0.5 \times P_{ase}, \text{total} \tag{8}$$

[Formula 9]

$$P2 = (1 - t \times 0.5) \times P_{sig} + 0.5 \times P_{ase}, \text{total} \tag{9}$$

Based on the relation between the formula (8) and the formula (9), the power Psig [mW] of the signal light component may be expressed by the following formula (10).

[Formula 10]

$$P_{sig} = \frac{P2 - P1}{1 - t} \tag{10}$$

Based on the relation of the above-described formula (5) and the relation between the formula (8) and the formula (9), the relation of the following formula (11) is made to obtain the total power Pase, total of the ASE component.

[Formula 11]

$$P_{ase}, \text{total} = \left(P1 + P2 - \frac{P2 - P1}{1 - t}\right) \tag{11}$$

If the relation of the formula (11) is converted into the ASE power Pase, 0.1 nm of 0.1 nm band by using the bandwidth B [nm] of the wavelength filter 12, the relation of the following formula (12) is obtained.

[Formula 12]

$$P_{ase}, 0.1 \text{ nm} = \left(P1 + P2 - \frac{P2 - P1}{1 - t}\right) \times \frac{0.1}{B} \tag{12}$$

Therefore, OSNR [dB] in the signal optical wavelength to be measured may be expressed by the following formula (13) based on the relation between the formula (10) and the formula (12).

[Formula 13]

$$OSNR[\text{dB}] = 10 \times \log(P_{sig}) - 10 \times \log(P_{ase}, 0.1 \text{ nm}) = \quad (13)$$
$$10 \times \log\left(\frac{P2 - P1}{1 - t}\right) - 10 \times \log\left[\left(P1 + P2 - \frac{P2 - P1}{1 - t}\right) \times \frac{0.1}{B}\right]$$

Figure 10:
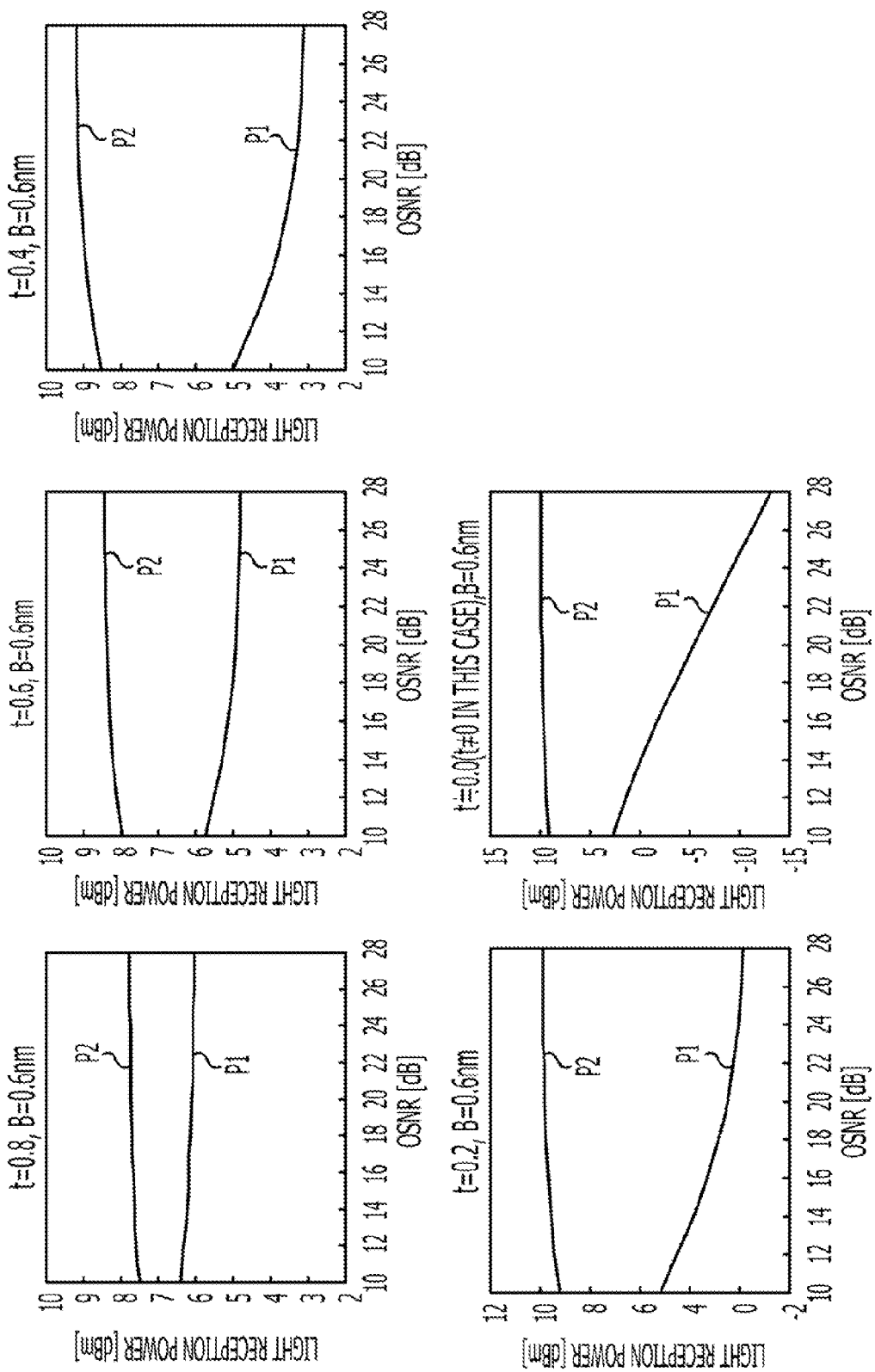
FIG. 10 is a diagram illustrating an example of a relation between an average optical power and the OSNR of each photo detector when the ratio of the optical delay amount corresponding to the time of 1 bit is varied.
Figure 11:
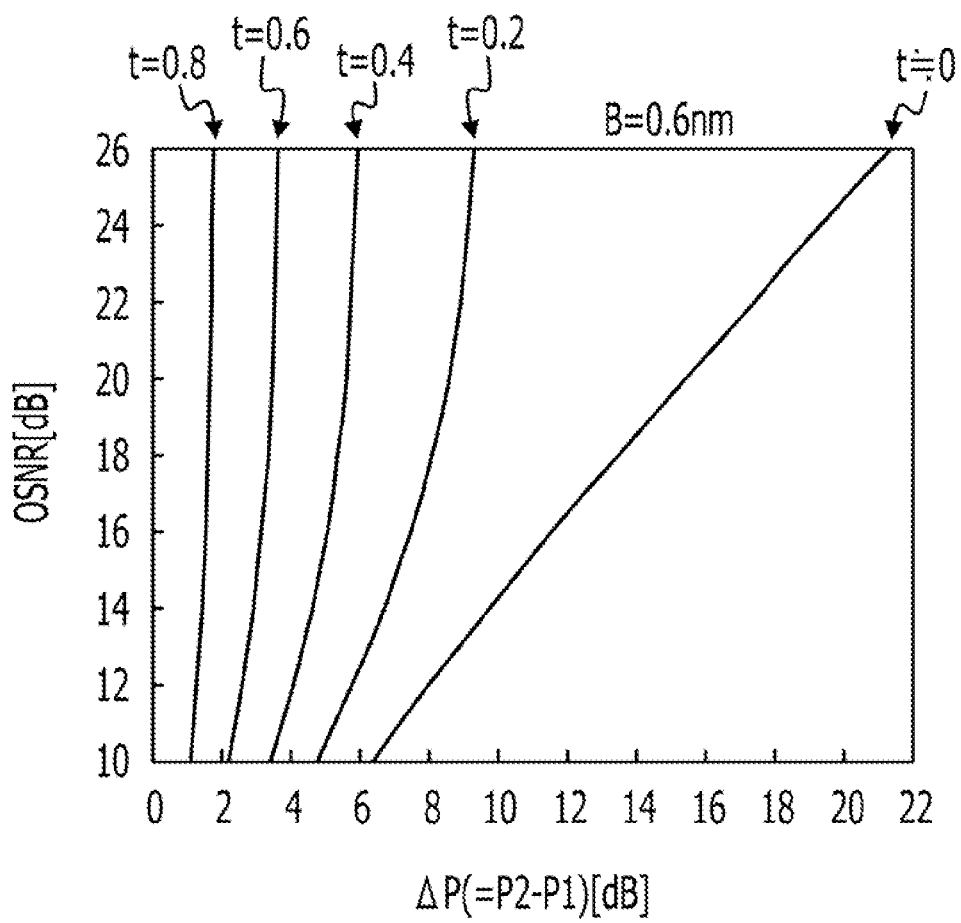
FIG. 11 is a diagram illustrating an example of a relation between a difference of the average optical power of each photodetector and the OSNR.

FIG. 10 is a diagram illustrating an example of the relation between the OSNR [dB] and the average powers P1 [dBm] and P2 [dBm] from the photodetectors 151 and 152 that is obtained when the bandwidth of the wavelength filter 12 is B=0.6[nm] and when the ratio of the optical delay amount τ corresponding to the time of 1 bit is varied from t≈0 to t=0.8. As illustrated in FIG. 10, the difference between P1 and P2 increases if the OSNR is larger. Furthermore, the difference between P1 and P2 increases if t is smaller. FIG. 11 is a diagram illustrating an example of a relation between the OSNR and a difference ΔP [dB] between P1 and P2. As illustrated in FIG. 11, by decreasing t to calculate ΔP, the OSNR of the signal light of the phase demodulation method may be measured at high accuracy.

To calculate the OSNR of the signal optical wavelength to be measured according to the above-described relation, the OSNR calculation circuit 16 obtains the average optical powers P1 and P2, which are detected by the photodetectors 151 and 152, based on the output signal of the photodetectors 151 and 152 in Operation 105 in FIG. 7.

In Operation 106', based on setting of the transmission rate of the signal light and the optical delay amount τ of the delay interferometer 14, the ratio t of the light delay amount τ corresponding to the time of 1 bit is determined. The power Psig of the signal light component expressed by the formula (10) is calculated by using the ratio t and the average optical powers P1 and P2 detected by the photodetectors 151 and 152. In Operation 107', the ASE power Pase, 0.1 nm of 0.1 nm band expressed by the formula (12) is calculated by using the ratio t of the optical delay amount τ corresponding to the time of 1 bit, the average optical powers P1 and P2 detected by the photodetectors 151 and 152, and the bandwidth B of the wavelength filter 12. In Operation 108, the OSNR of the signal optical wavelength to be measured according to the formula (13) is calculated by using Psig and Pase, 0.1 nm.

According to the OSNR measuring device 1 of the first embodiment, an arbitrary transmission rate included in the light to be measured L and the OSNR of the signal light of the optical modulation method may be measured with high accuracy without using an expensive optical spectrum analyzer. The light in the desired band corresponding to the signal optical wavelength to be measured is taken out from the light to be measured L, which is given to the input port 11, and is then given to the delay interferometer 14 by the wavelength filter 12. Due to this, the OSNR measuring system may be separated from the receiving processing system of the signal light (for example, the branch unit 54 and the optical receiver 55 in FIG. 6). Accordingly, even if the signal light to be measured is in operation, the OSNR measurement may be performed. The OSNR measurement of a test light or the like transmitted before the operation may be performed.

Figure 12:
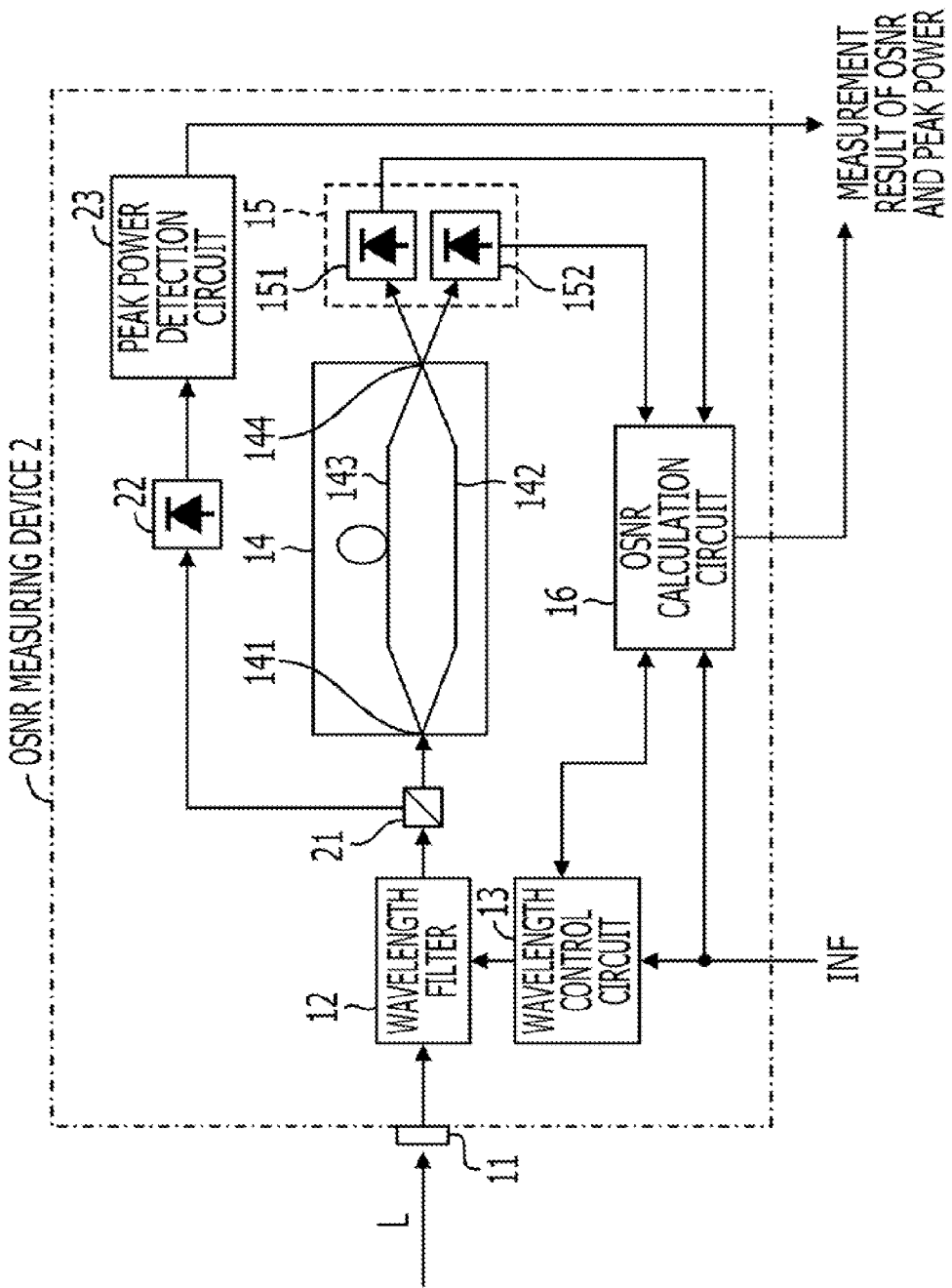
FIG. 12 is a diagram illustrating an example of the OSNR measuring device according to a second embodiment.

A second embodiment of the OSNR measuring device of the present invention will be described below. FIG. 12 is a diagram illustrating an example of the OSNR measuring device according to the second embodiment. In FIG. 12, regarding the configuration of the first embodiment illustrated in FIG. 3, an OSNR measuring device 2 according to the present embodiment adds a function for detecting a peak power of the output light from the wavelength filter 12, so that information of the peak power as well as the OSNR may be obtained with respect to the quality of the signal light to be measured.

Specifically, the branch unit 21 is inserted onto an optical path between the wavelength filter 12 and the delay interferometer 14. The branch unit 21 branches part of the light, which is transmitted from the wavelength filter 12 to the delay interferometer 14, and transmits the branched light to a photodetector 22. The photodetector 22 converts the light branched by the branch unit 21 into an electric signal and outputs the electric signal to a peak power detection circuit 23. The peak power detection circuit 23 detects the peak power of the output signal of the photodetector 22 and outputs a detection result to an external unit of the OSNR measuring device 2.

The OSNR measuring device 2 with the above-described configuration detects the peak power of the signal light to be subjected to the OSNR measurement by using the output light from the wavelength filter 12. Based on the detection result, the state of waveform deterioration due to a Differential Group Delay (DGD) of the signal light or to wavelength dispersion may be determined.

Figure 13:
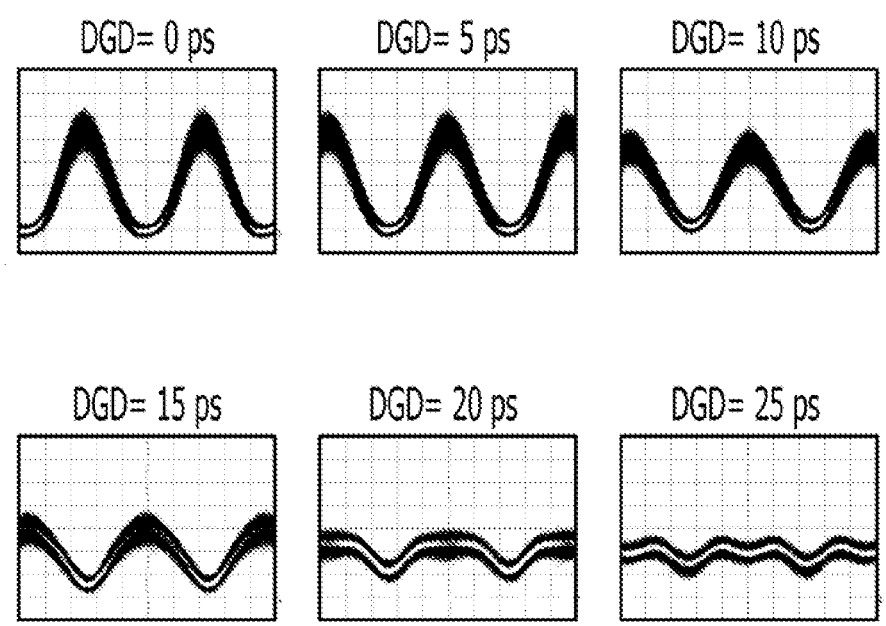
FIG. 13 is a diagram illustrating an example of a case where an output optical waveform from a wavelength filter is deteriorated by a DGD.
Figure 14:
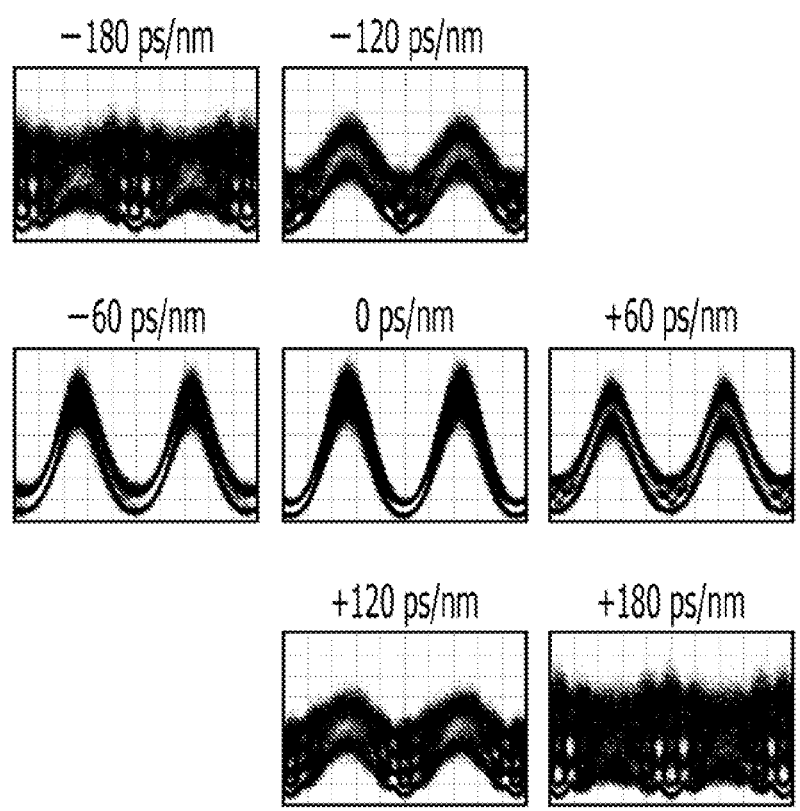
FIG. 14 is a diagram illustrating an example of a case where the output optical waveform from the wavelength filter is deteriorated by wavelength dispersion.

FIG. 13 is a diagram illustrating an example of a case where the output light waveform from the wavelength filter 12 is deteriorated due to the DGD. FIG. 14 is a diagram illustrating an example of the output optical wavelength from the wavelength filter 12 is deteriorated due to the wavelength dispersion. In this case, the signal light that is subjected to RZ-DQPSK modulation of 43.02 Gbps is measured. As illustrated in FIG. 13, the optical waveform is deformed as the value of the DGD increases, so that the peak power of the light decreases. As illustrated in FIG. 14, the optical waveform is deformed as the value of wavelength dispersion deviates 0 ps/nm, the peak power of the light decreases in the similar way as the case of the DGD. Accordingly, the quality of the signal light may be measured by taking out part of the light output from the wavelength filter 12 to the delay interferometer 14 by the branch unit 21, and monitoring the peak power of light strength by the photodetector 22 and the peak power detection circuit 23.

As described above, according to the OSNR measuring device of the second embodiment, the OSNR measurement may be performed on the signal light to be measured in the similar way as the first embodiment. Furthermore, the OSNR measuring device 2 may determine the deterioration of the waveform due to the DGD or the wavelength dispersion based on the value of the peak power detected by the peak power detection circuit 23, so that the quality of the signal light may be measured in various angles.

Figure 15:
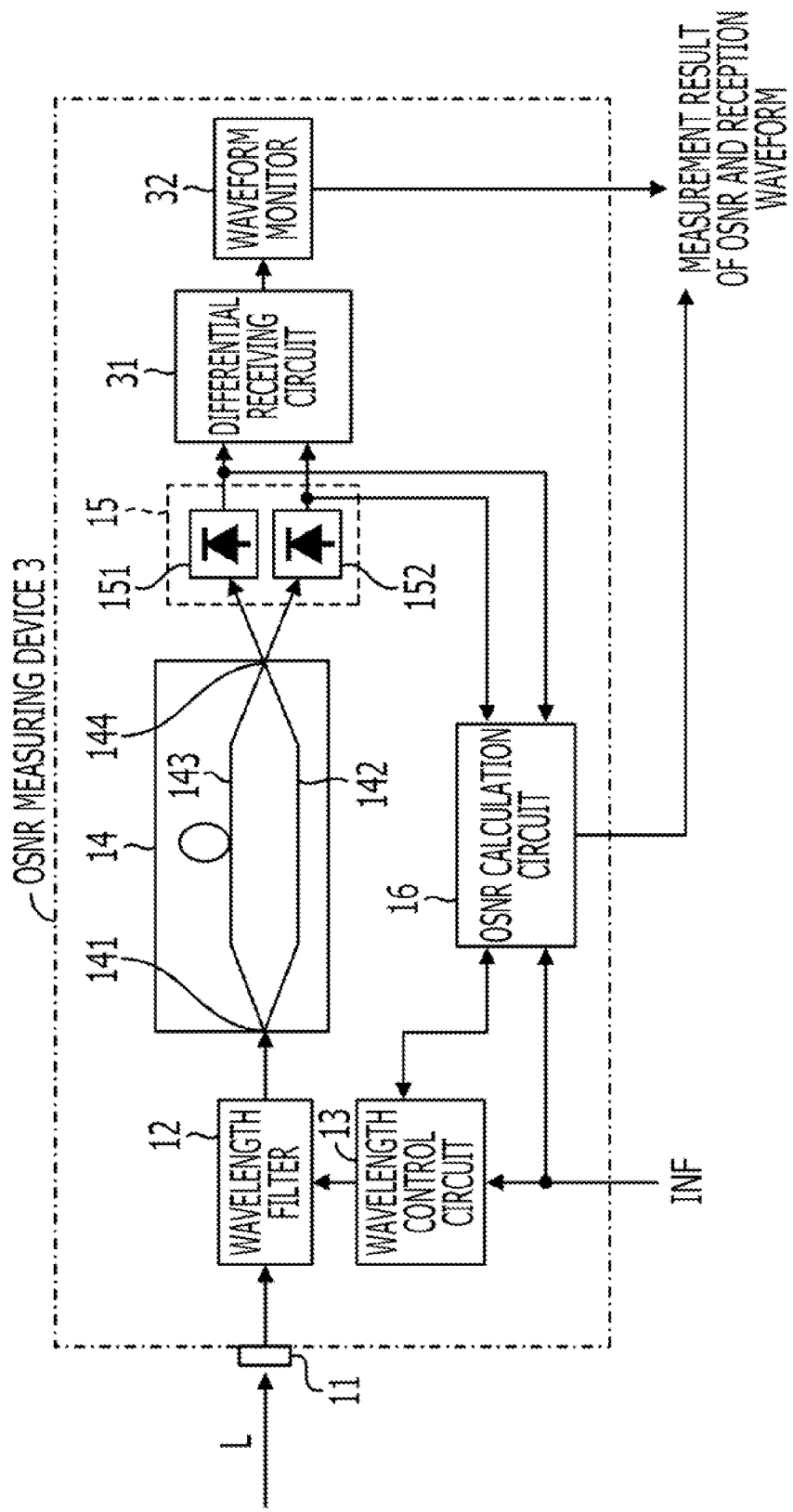
FIG. 15 is a diagram of an example of the OSNR measuring device according to a third embodiment.

A third embodiment of the OSNR measuring device according to the present invention will be described below. FIG. 15 is a diagram illustrating an example of the OSNR measuring device according to the third embodiment. As illustrated in FIG. 15, regarding the configuration illustrated according to the first embodiment illustrated in FIG. 4, the OSNR measuring device 3 adds a differential receiving circuit 31 that performs receiving processing on the output signal of the photodetectors 151 and 152, and a waveform monitor 32 that monitors a waveform of a reception signal output from the differential receiving circuit 31 to obtain information of the reception waveform as well as the OSNR. In the above-described configuration, if the reception waveform of the signal light as the OSNR measurement target is monitored by using the electric signal obtained by the photodetector 15, the state of waveform deterioration caused by the wavelength dispersion or the DGD of the signal light may be determined.

Figure 16:
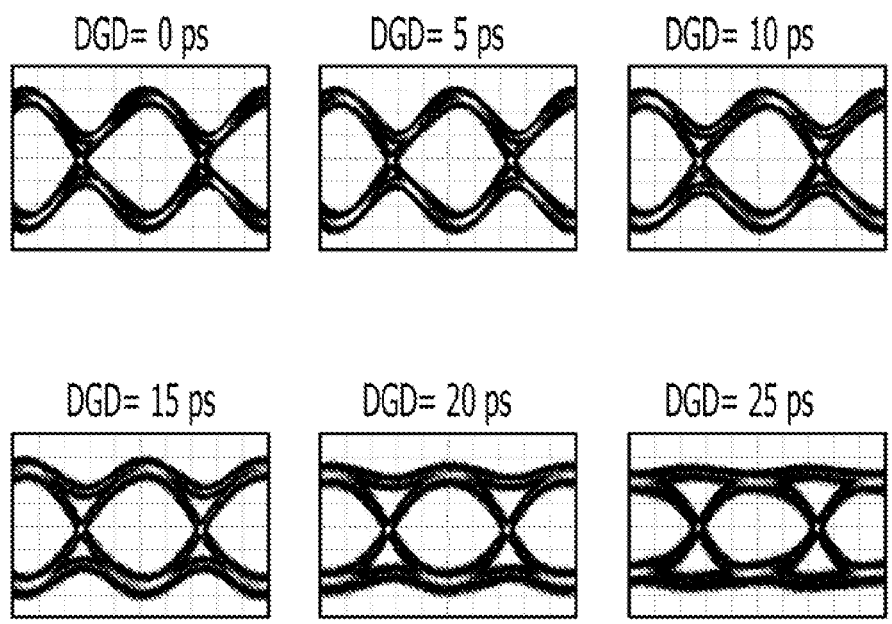
FIG. 16 is a diagram illustrating an example where a waveform of a reception signal that is subjected to delay interference is deteriorated.
Figure 17:
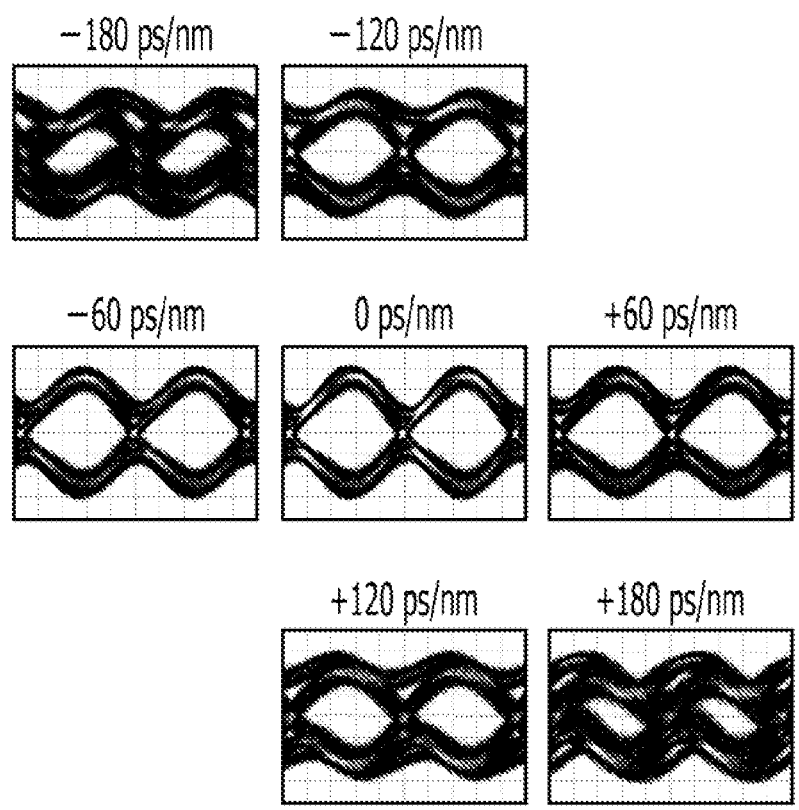
FIG. 17 is a diagram illustrating an example where the waveform of the waveform of the reception signal that is subjected to delay interference is deteriorated due to the wavelength dispersion.

FIG. 16 is a diagram illustrating an example of a case where the wavelength of the reception signal that is subjected to delay interference is deteriorated by the DGD. FIG. 17 is a diagram illustrating an example of a case where the waveform of the reception signal is deteriorated due to the wavelength dispersion. In this case, the signal light that is subjected to the RZ-DQPSK modulation of 43.02 Gbps is measured. As illustrated in FIG. 16, the reception waveform deteriorates as the value of DGD increases, so that an eye opening part becomes smaller. As illustrated in FIG. 17, the reception wavelength is deteriorated as the value of the wavelength dispersion deviates from 0ps/nm, and the eye opening part becomes smaller in the similar way as the case of the DGD. Therefore, the quality of the signal light may be measured by performing receiving processing on the output signal from the photodetectors 151 and 152 by the differential receiving circuit 31 and monitoring the waveform of the reception signal by the waveform monitor 32.

As described above, according to an OSNR measuring device 3 of the third embodiment, the OSNR measurement may be performed on the signal light to be measured in the similar as the above-described embodiment. Furthermore, waveform deterioration due to the DGD or the wavelength dispersion may be determined based on the reception waveform to be monitored by the waveform monitor 32, so that the quality of the signal light may be measured from various angles.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. An Optical Signal to Noise Ratio (OSNR) measuring device comprising:
    an input port to which a signal light is given;
    a wavelength filter which is optically coupled to the input port, includes a passband, and selectively takes out an optical component corresponding to a signal optical wavelength to be measured from the signal light;
    a delay interferometer which branches a light output from the wavelength filter and delays one of the branched lights with respect to the other branched light and in which the branched lights are made to interfere with each other;
    a photodetector which detects a power of a delay interference light output from the delay interferometer; and
    an OSNR calculation circuit which calculates, based on a bandwidth of a passband of the wavelength filter and the power of the delay interference light detected by the photodetector, an optical signal to noise ratio (OSNR) of a signal optical wavelength to be measured, the OSNR being calculated according to the following equation $$OSNR[\text{dB}] = 10 \times \log(P_{sig}) - 10 \times \log(P_{ase}, 0.1 \text{ nm}) =$$
$$10 \times \log\left(\frac{P2 - P1}{1 - t}\right) - 10 \times \log\left[\left(P1 + P2 - \frac{P2 - P1}{1 - t}\right) \times \frac{0.1}{B}\right],$$

wherein Psig is power of the signal light, Pase is power of the Amplified Spontaneous Emission (ASE), P2 is an average power of one of the branched lights, P1 is an average power of the other of the branched lights, t is a ratio of an optical delay amount, and B is the bandwidth.

2. The OSNR measuring device according to claim 1, further comprising a wavelength control circuit which controls the passband of the wavelength filter.

3. The OSNR measuring device according to claim 1, wherein the wavelength filter comprises a monochromator, and
    wherein a wavelength control circuit controls an angle of a grating provided with the monochromator so that a central wavelength of the basspand of the monochromator corresponds to the signal optical wavelength to be measured.

4. The OSNR measuring device according to claim 1, wherein the wavelength filter includes a wavelength variable filter, and
    wherein a wavelength control circuit controls the wavelength variable filter so that a central wavelength of the passband of the wavelength variable filter corresponds to the signal optical wavelength to be measured.

5. The OSNR measuring device according to claim 1, wherein the wavelength filter includes a wavelength/bandwidth variable filter, and
    wherein a wavelength control circuit controls the wavelength/bandwidth variable filter so that the central wavelength of the passband of the wavelength/bandwidth variable filter corresponds to the signal optical wavelength and the bandwidth of the passband of the wavelength/bandwidth variable filter is a value corresponding to a spectrum width of the signal light to be measured.

6. The OSNR measuring device according to claim 1, wherein the wavelength filter includes a wavelength selection switch, and
    wherein a wavelength control circuit controls an angle of a variable mirror provided on the wavelength selection switch so that a central wavelength of the passband of the wavelength selection switch corresponds to the signal optical wavelength to be measured.

7. The OSNR measuring device according to claim 1, wherein the delay interferometer delays one of the branched lights with respect to the other branched light so that a phase difference between the branched lights is one of 0 and π radian.

8. The OSNR measuring device according to claim 1, wherein the delay interferometer comprises:
    a Y branch unit which branches the light output from the wavelength filter into two lights;
    a first arm in which one of the two lights branched by the Y branch unit is propagated;
    a second arm in which the other of the two lights branched by the Y branch unit is propagated and which has an optical path length which is longer than the first arm; and a Mach-Zehnder Interferometer Type optical waveguide in which the two lights propagated in the first arm and the second arm are made to interfere with each other, and which provides an X coupler unit which outputs the delay interference light from the two output ports to the photodetector, and wherein the photodetector comprises:

a first photodetector which receives the delay interference light output from one of the output ports of the delay interferometer and generates an electric signal of which a level varies according to the optical power; and a second photodetector which receives the delay interference light output from the other output port of the delay interferometer and generates the electric signal of which the level varies according to the optical power.

9. The OSNR measuring device according to claim 1, further comprising a peak power detection circuit that detects a peak power of a light which is output from the wavelength filter.

10. The OSNR measuring device according to claim 1, further comprising a monitor circuit which performs receiving processing on a signal which is output from the photodetector and monitors a waveform of the reception signal.

11. The OSNR measuring device according to claim 10, wherein the monitor circuit includes a differential receiving circuit which differential-receives a signal which is output from the photodetector and a waveform monitor which monitors the waveform of the reception signal which is output from the differential receiving circuit.

12. An Optical Signal to Noise Ratio (OSNR) measuring device comprising:

an input port to which a signal light is given;

a wavelength filter which is optically coupled to the input port, has a passband, and selectively takes out an optical component corresponding to a signal optical wavelength to be measured from the signal light;

a delay interferometer which branches a light output from the wavelength filter and delays one of the branched lights with respect to the other branched light and in which the branched lights are made to interfere with each other;

a pair of photodetectors which correspondingly detect a first signal power plus a first amplified spontaneous emission ("ASE") power output from one of the two ports of the delay interferometer and a second signal power plus a second ASE power output from the other of the two ports output from the delay interferometer, the second ASE power being equal to or close to the first ASE power; and an OSNR calculation circuit which calculates, based on information indicating a bandwidth of the passband of the wavelength filter, the first signal power, the second signal power, the first ASE power, and the second ASE power, and light delay amount of the delay interference, an optical signal to noise ratio of the signal optical wavelength to be measured.

13. An Optical Signal to Noise Ratio (OSNR) measuring device comprising:

a wavelength filter which has a passband, and selectively takes out an optical component corresponding to a signal optical wavelength to be measured from a signal light received;

a delay interferometer which branches a light output from the wavelength filter and delays one of the branched lights with respect to the other branched light and in which the branched lights are made to interfere with each other;

a pair of photodetectors which correspondingly detect a first power from one of the two ports of the delay interferometer and a second power output from the other of the two ports the delay interferometer; and an OSNR calculation circuit which calculates, based on information indicating a bandwidth of the passband of the wavelength filter, the first power, the second power, and light delay amount of the delay interference light detected by the photodetector, an optical signal to noise ratio of the signal optical wavelength to be measured.

* * * * *